United States Patent
Gorohata et al.

(10) Patent No.: US 7,088,026 B2
(45) Date of Patent: Aug. 8, 2006

(54) STATOR ARRANGEMENT OF ROTARY ELECTRIC MACHINE

(75) Inventors: Tetsuya Gorohata, Anjo (JP); Takashi Kumakura, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/140,747

(22) Filed: Jun. 1, 2005

(65) Prior Publication Data

US 2005/0269890 A1    Dec. 8, 2005

(30) Foreign Application Priority Data

Jun. 2, 2004   (JP) ............................. 2004-164188

(51) Int. Cl.
  *H02K 3/04* (2006.01)
  *H02K 3/28* (2006.01)
(52) U.S. Cl. .................. 310/184; 310/179; 310/71; 310/201
(58) Field of Classification Search ................ 310/179, 310/180, 184, 71, 201
See application file for complete search history.

(56) References Cited

U.S. PATENT DOCUMENTS

| | | | |
|---|---|---|---|
| 6,492,757 B1 * | 12/2002 | Nakamura et al. | 310/180 |
| 6,552,463 B1 * | 4/2003 | Oohashi et al. | 310/207 |
| 2003/0121139 A1 | 7/2003 | Katou et al. | |

FOREIGN PATENT DOCUMENTS

| JP | A 2003-199304 | 7/2003 |
|---|---|---|
| WO | WO 92/06527 A1 | 4/1992 |

* cited by examiner

*Primary Examiner*—Karl Tamai
(74) *Attorney, Agent, or Firm*—Oliff & Berridge PLC (57) ABSTRACT

In a stator of a rotary electric machine that includes a stator winding and a stator core having a plurality of slots, the stator winding is constituted of a plurality of series-connected regular U-shaped segments each of which has a pair of in-slot portions and a plurality of U-shaped irregular segments each of which has a pair of in-slot portions disposed in a pair of slots that is suitable to connect the regular segments to form the stator winding and a continuous crossover portion crossing over some of the regular segments. The irregular U-shaped segments extend to be in contact with the turn portions of the regular segments. Therefore, the regular segments are connected by the irregular segments that have least electric resistance.

12 Claims, 6 Drawing Sheets

STATOR ARRANGEMENT OF ROTARY ELECTRIC MACHINE

CROSS REFERENCE TO RELATED APPLICATION

The present application is based on and claims priority from Japanese Patent Application 2004-164188, filed Jun. 2, 2004, the contents of which are incorporated herein by reference.

BACKGROUND OF THE INVENTION

1. Field of the Invention

The present invention relates to a stator of a rotary electric machine to be mounted in a vehicle such as a passenger car or a truck.

2. Description of the Related Art

A stator of a rotary electric machine such as a motor or a generator includes a stator core having plural slots. Laid-open patent publications WO92/06527 and JP-A-2003-199304, or its counterpart US 2003/0121139 A1 disclose stators having plural slots in which U-shaped conductor segments are inserted.

The stator disclosed in WO92/06527 has irregular U-shaped conductor segments besides regular U-shaped conductor segments, which are welded to one another to form a stator winding. When the stator winding is formed, the turn portion of the irregular U-shaped conductor segments are twisted by a twisting ring. Therefore, it is necessary for the turn portions of the irregular U-shaped conductor segments to have certain height from an axial end of the stator core. In other words, the irregular U-shaped conductor segments increases resistance of the stator winding.

The stator disclosed in US 2003/0121139 A1 also has irregular U-shaped conductor segments to connects the regular U-shaped conductor segments. These irregular U-shaped conductor segments are formed to have an S-shaped meander on the top of the turn portions to connect the regular U-shaped conductor segments. That is, the S-shaped meander increases the length and the resistance of the stator winding.

SUMMARY OF THE INVENTION

It is an object of the invention to provide an improved stator of a rotary electric machine that has a stator winding of a lower resistance.

According to a preferred embodiment of the invention, a stator winding includes a plurality of series-connected regular segments having a pair of in-slot portions inserted into a regularly disposed pair of the slots and a turn portion and a plurality of irregular segments having a pair of in-slot portions disposed in a pair of slots whose location is suitable to connect the regular segments to form the stator winding and a continuous crossover portion crossing over some of the regular segments and extending to be in contact with the turn portion of the regular segments.

Therefore, the irregular segments can be made straight, so that the regular segments can be connected by its crossover portion as short as possible and do not significantly increase the resistance of the stator winding.

Preferably, the crossover portions extends in the circumferential direction of the stator core. Some of the crossover portions may extend in a direction inclined to the circumferential direction of the stator core. The plurality of regular segments of the above embodiment preferably includes first subsets of conductor segments disposed at inner circumference of the stator core that includes a large regular U-shaped conductor segment and a small regular U-shaped conductor segment and second subsets of a conductor segment that includes a regular U-shaped conductor segment that has the same shape as, and a smaller height from an axial end of the stator core than, the first subset.

Preferably, the first subset is disposed radially inside the second subset so that the turn portions of the regular segments disposed radially inside of the stator core can be higher than those disposed radially outside of the stator core. This arrangement is effective to limit or minimize the height and the outside diameter of the coil end groups and, also, the length of the stator winding.

Further, the crossover portion of the irregular segments is preferably disposed between the first subsets and the second subsets.

The irregular segment may have a pair of inclined portions each of which extends from the crossover portion in parallel with an inclined portion of an adjoining regular U-shaped segment. The two neighboring regular segments that are crossed by the crossover portion are arranged to be closer to each other in the circumferential direction than other regular segments.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A preferred embodiment of the present invention will be described with reference to the appended drawings.

Figure 1:
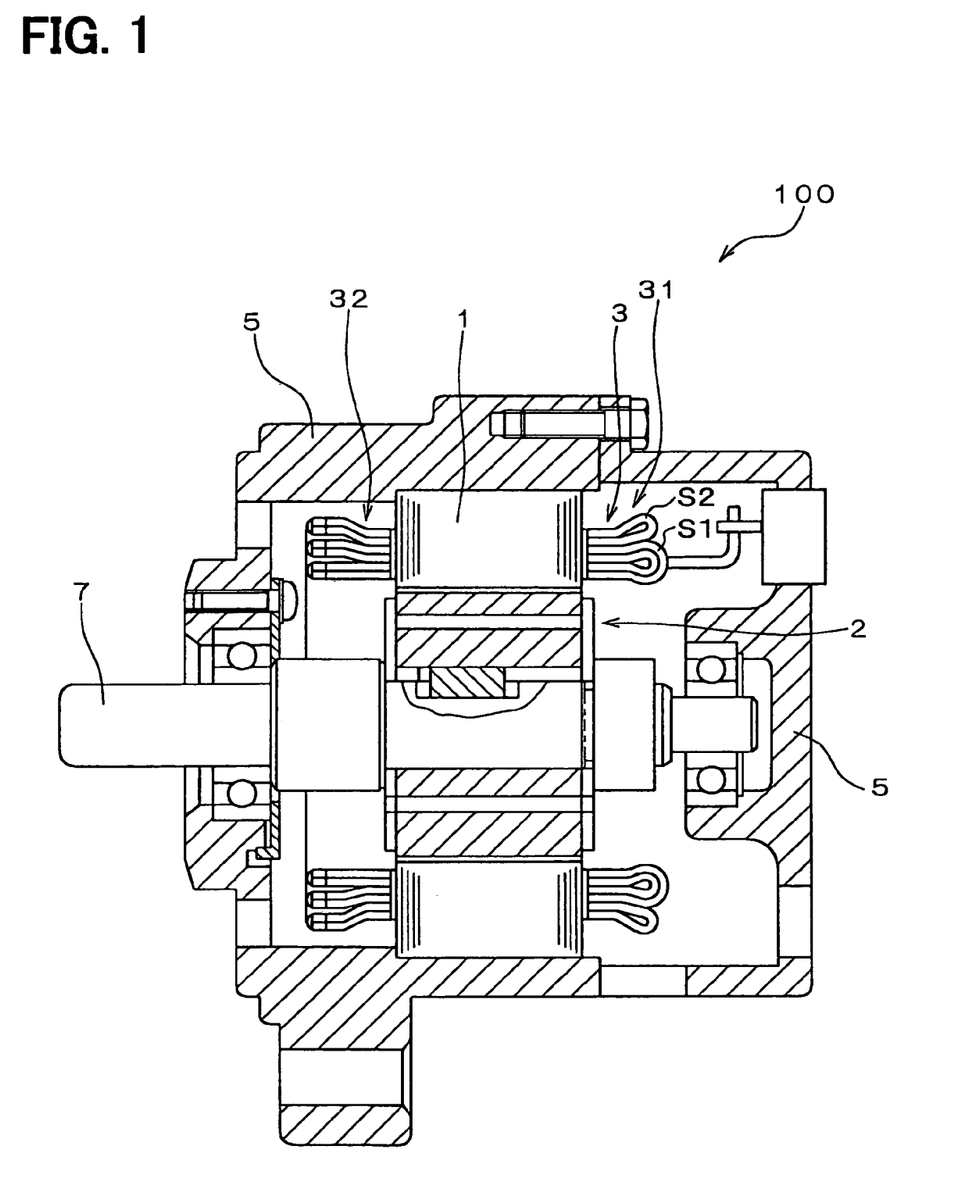
FIG. 1 is a schematic cross-sectional longitudinal view of a motor according to a preferred embodiment of the invention.

As shown in FIG. 1, a motor 100 according to the preferred embodiment of the invention includes a stator core 1, a rotor 2, a stator winding 3, a housing 5 and a rotary shaft 7.

The stator core 1 is a ring shaped magnetic member that has plural slots 35 at the radially inside surface and is held by the housing 5. The stator winding 3 is a three-phase winding, which is driven by a three-phase inverter control circuit. The stator winding 3 is held in the slots 35 of the stator core 1 and has a pair of coil end groups 31, 32 at the opposite axial ends of the stator core 1, forming a stator of the motor 100. The coil-end portions 31, 32 respectively extend in the opposite axial directions of the rotary shaft 7 from the opposite axial ends of the stator core 1. The rotor 2 is rotatably supported by the housing 5 via the rotary shaft 7.

Figure 2:
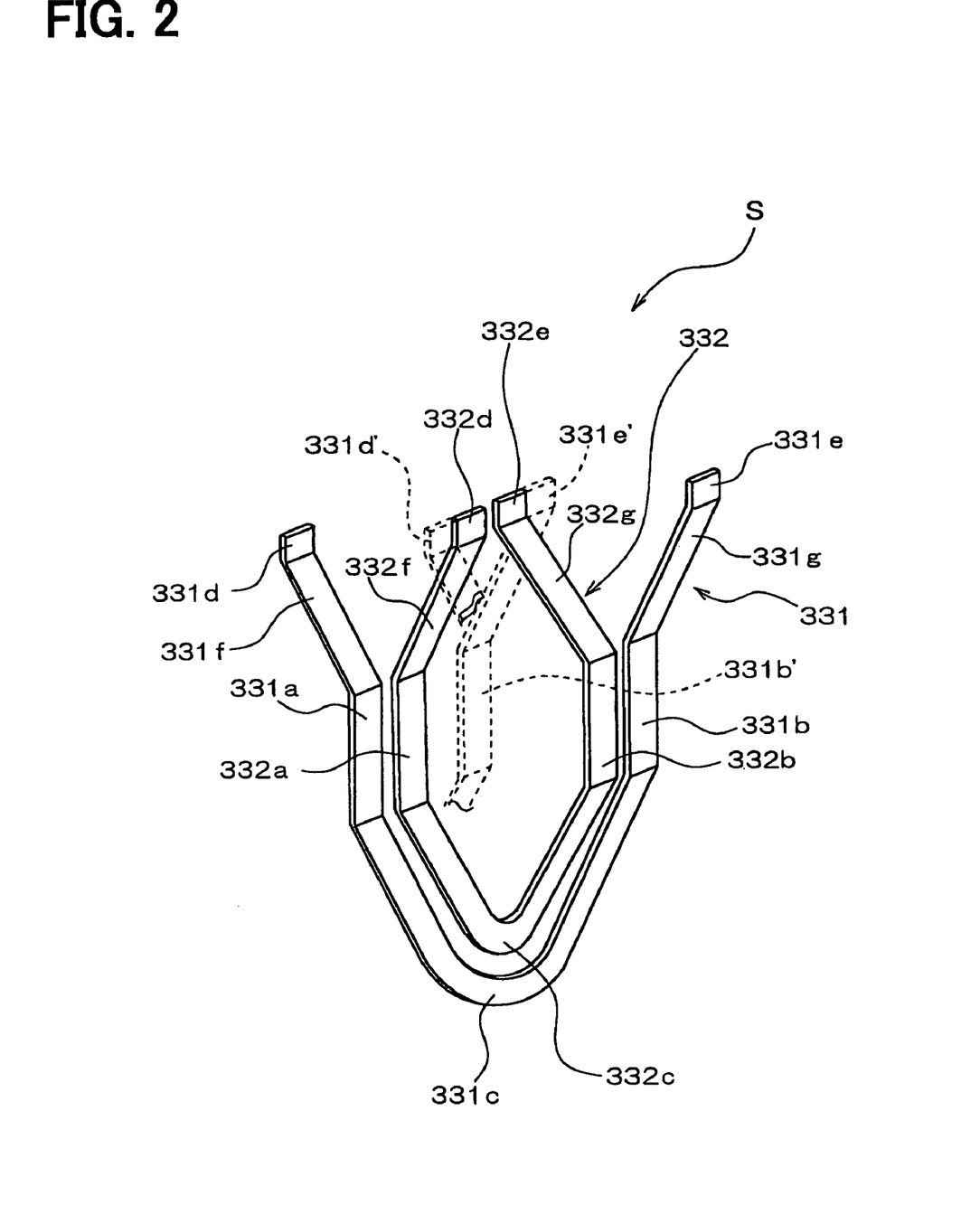
FIG. 2 is a perspective view of a pair of regular U-shaped conductor segments to be used in the motor according to the preferred embodiment.

The stator winding 3 is formed of a plural sets of regular U-shaped conductor segments 331, 332, as shown in FIG. 2. Each regular U-shaped conductor segment is inserted into a pair of slots 35 of the stator core 1 from one axial end of the stator core 1 so that a preset length of the end portions of each regular conductor segment protrudes from the other axial end of the stator core 1. Then the end portions of each regular U-shaped conductor segment are respectively twisted and welded to end portions of other conductor segments that are apart by π/2 radian in electric angle from the the end portions. Incidentally, the conductor segments are covered with insulation material except the connected and welded portions.

Figure 3:
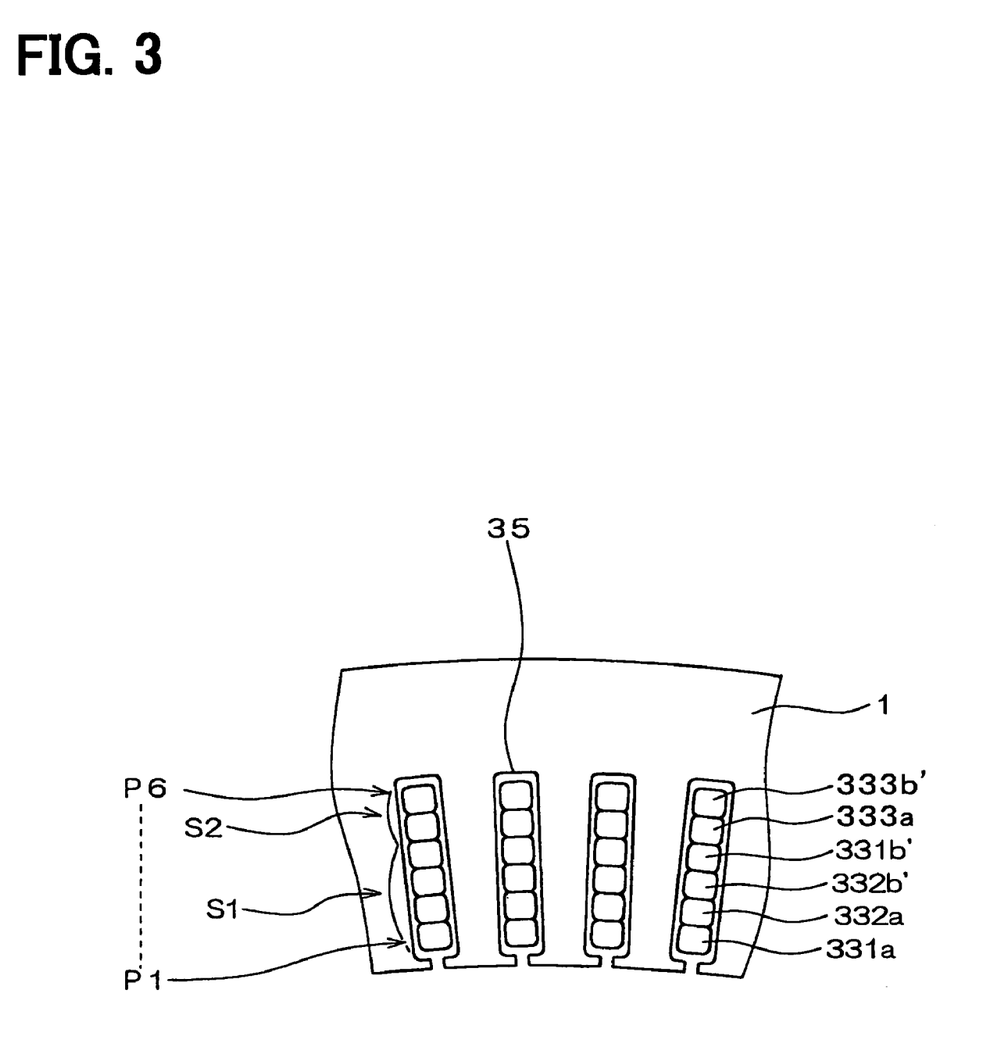
FIG. 3 is a cross-sectional view of a stator of the motor according to the preferred embodiment.

As shown in FIGS. 1 and 3, one set S of regular U-shaped conductor segments to be mounted into the stator core 1 includes a first subset S1 of conductor segments 331, 332 disposed at inner circumference of the stator core and a second subset S2 of a conductor segment 333. In other words, the first subset S1 includes four straight in-slot portions 331a, 331b, 332a, 332b, and the second subset S2 includes two straight in-slot portions 333a, 333b (not shown) that corresponds to a straight in-slot portion 333b of another conductor segment 333, as shown in FIG. 3.

The first subset S1 includes a large regular U-shaped conductor segment (hereinafter referred to as the large segment) 331 and small regular U-shaped conductor segment 332 (hereinafter referred to as the small segment), each of which has a turn portion (or V-shaped head portion) to be disposed on one axial end of the stator core 1, a pair of straight in-slot portions that extends from the turn portion to be inserted into a pair of the slots 35 of the stator core 1 and a pair of the above stated end portions that protrudes from the other axial end of the stator core 1. Before the large or small segment 331, 332 is inserted into one of the slots 35, it is not processed and remains straight.

The stator winding 3 includes a first coil end group (head side coil end group) 31 coaxially disposed at one axial end of the stator core 1 and a second coil end group (tail side coil end group) 32 coaxially disposed at the other axial end of the stator core 1 and in-slot group 35 disposed in the slots of the stator core 1.

As shown in FIG. 2, the large segment 331 of the first subset S1 includes a pair of in-slot portions 331a and 331b, a head portion (or turn portion) 331c and a pair of end portions 331f and 331g. Each end portion 331f, 331g has a connection portion 331d or 331e that is to be welded to a connection portion of another small segment that is to be adjacent thereto. The small segment 332 of the same first subset also includes a pair of in-slot portions 332a and 332b, a head portion (or turn portion) 332c and a pair of end portions 332f and 332g. Each end portion 332f, 332g also has a connection portion 332d or 332e that is to be welded to a connection portion 331d' or 331e' of another large segment that is to be adjacent thereto in a radial direction of the stator core 1.

The in-slot portion 331a of the large segment 331 is disposed in the inner most layer (hereinafter referred to the first layer P1) of a certain slot and the in-slot portion 332a of the small segment 332 is disposed in the next inner layer (hereinafter referred to as the second layer P2) of the same slot; and the in-slot portions 332b, 331b of the same small and large segments 332, 331 are respectively disposed in the next layers (the third and fourth layers P3, P4) of another slot 35 that is a prescribed pitch T (e.g. one pole pitch or π radian in electric angle) apart from the certain slot. Therefore, the head portion 332c of the small segment 332 is surrounded by the head portion 331c of the large segment 331 of the same first subset S1.

The regular U-shaped segment 333 of the second subset S2 is the same in shape and size as the small segment 332 of the first subset S1. However the size and shape can be changed if necessary or preferable. One in-slot portion of the regular U-shaped segment of the second subset S2 is disposed in the fifth layer P5 of the certain slot and the other in-slot portion is disposed in the sixth layer P6 (outermost layer) of another slot 35 that is the prescribed pitch T apart from the certain slot.

As shown in FIG. 3, each slot 35 provides a space to accommodate the following six in-slot portions in radially aligned six layers P1–P6: the in-slot portions 331a, 332a of the certain first subset S1; the in-slot portions 332b', 331b' of another first subset S1 and the in-slot portions of two second subsets S2.

The stator winding 3 is composed of three phase-windings, each of which is composed of series-connected regular U-shaped conductor segments of the subsets S1 and series-connected regular U-shaped conductor segments of the subsets S2. Therefore, each phase winding winds threefold around the stator core 1.

Figure 4:
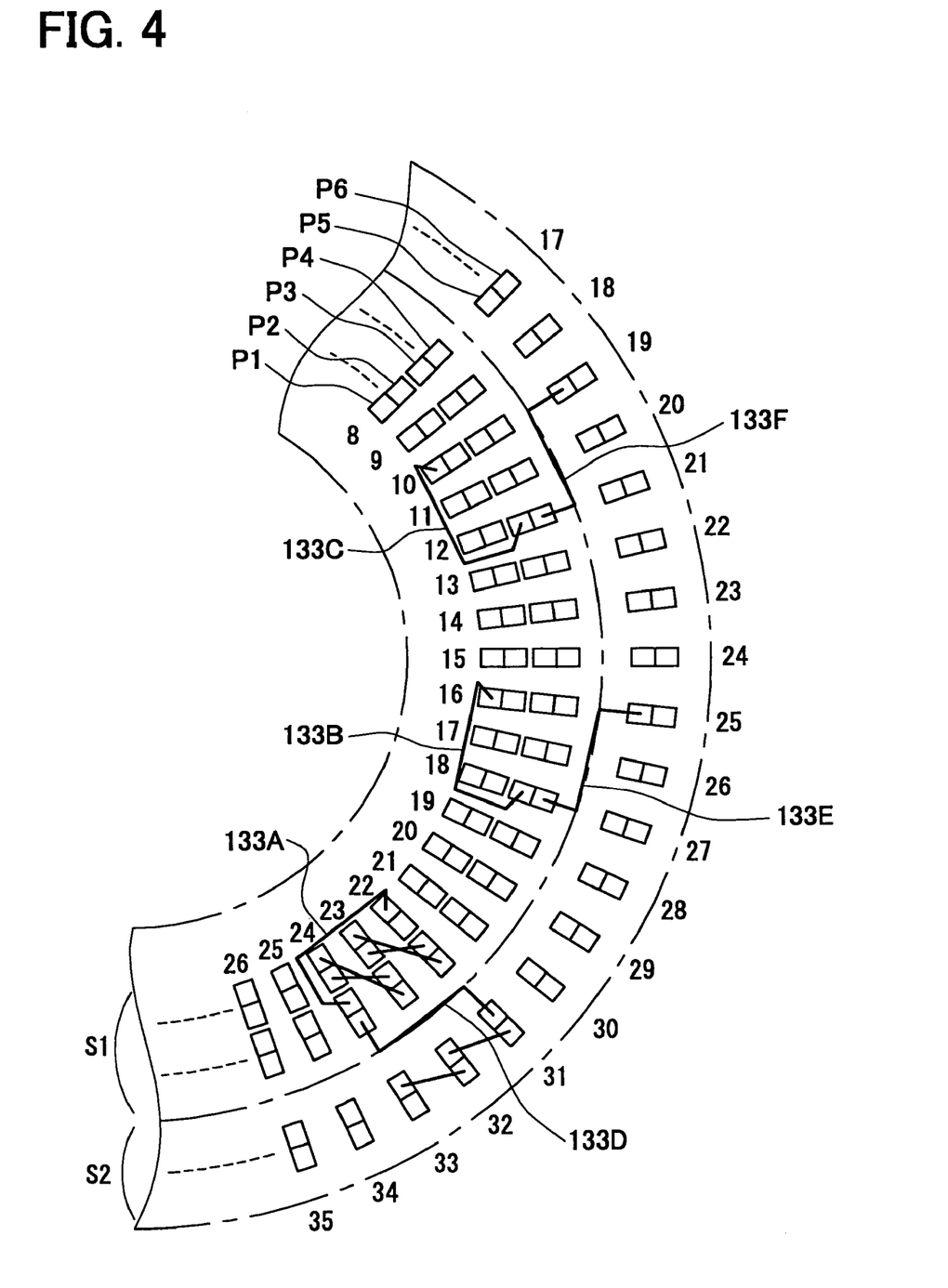
FIG. 4 is a schematic diagram illustrating disposition of irregular U-shaped conductor segments in the stator of the motor according to the preferred embodiment.

As shown in FIG. 4, plural irregular U-shaped conductor segments are employed to connect the regular U-shaped conductor segments to form the stator winding 3. Inner irregular segments 133A, 133B, 133C respectively connect the regular segments extending from the first layer P1 and the regular segments extending from the third layer. The outer irregular segments 133D, 133E, 133F respectively connect the regular segments extending from the fourth layer P4 and the regular segments extending from the fifth layer P5. In FIG. 4, numerals 8–26 on the radially inner side of the slots represent slot numbers (#) of slots in which the regular segments are twisted and inserted in the first, third and fifth layers, while numerals 17–35 on the radially outer side of the slots represent slot numbers (#) of slots in which the regular segments are twisted and inserted in the second, fourth and sixth layers.

Figure 5:
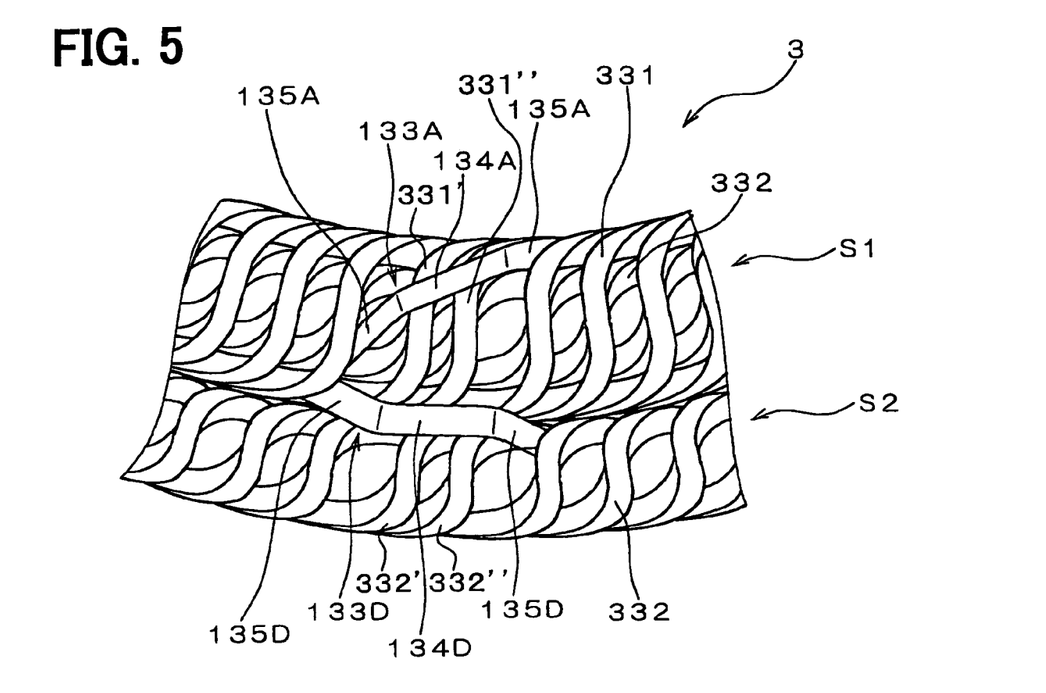
FIG. 5 is a fragmentary plan view of the stator illustrating disposition of irregular U-shaped conductor segments.
Figure 6:
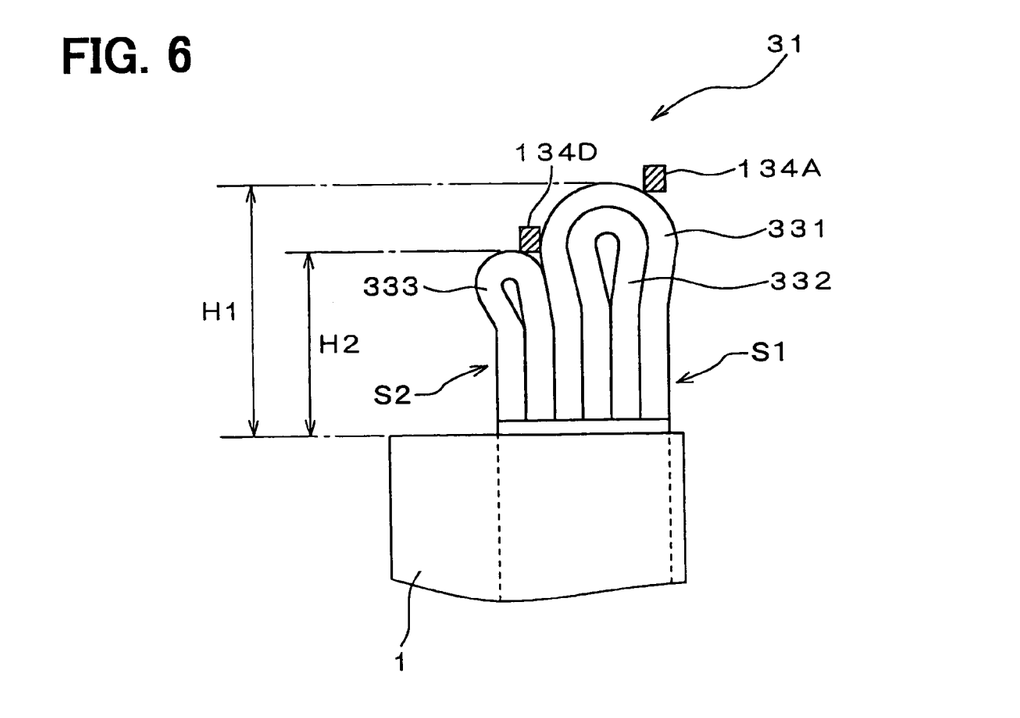
FIG. 6 is a schematic cross-sectional side view of the stator illustrating the disposition of irregular U-shaped conductor segments.
Figure 7:
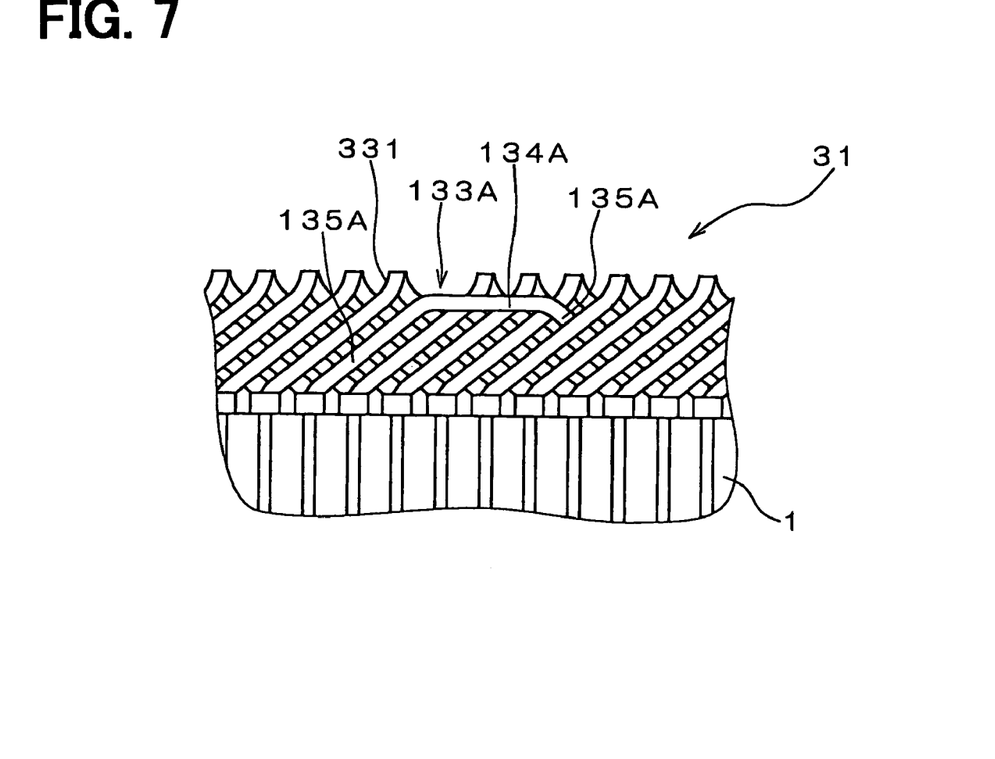
FIG. 7 is a side view of the stator viewed from radially inside thereof for illustrating the disposition of an irregular U-shaped conductor segment.

In other words, the inner irregular segment 133A has one in-slot portion that is disposed in the first layer P1 of slot #22 of the slots 35 and the other in-slot portion that is disposed in the third layer P3 of slot #24 of the slots 35. As shown in FIG. 5, the head portion of the inner irregular segment 133A includes a crossover portion 134A that extends in radially inside area of a circle on which the centers of the head portions 331c of the large segments 331 are located. The crossover portion 134A is continuous and does not have any connection portion therein. The crossover portion 134A is straight when projected on a surface in parallel with the axis of the stator core and inclines to the circumferential direction of the stator core. It extends along the center axis of the stator core to be almost in contact with the large segment 331, as shown in FIG. 6. The head portion of the inner irregular segment 133A also includes a pair of inclined portions 135A each of which extends from the crossover portion 134A to an in-slot portion in parallel with an inclined portion of an adjoining regular U-shaped segment, as shown in FIG. 7. The inner irregular segments 133B and 133C are substantially the same as the irregular segment 133A.

In other words, the inner irregular segment 133A has one in-slot portion that is disposed in the first layer P1 of slot #22 of the slots 35 and the other in-slot portion that is disposed in the third layer P3 of slot #24 of the slots 35. As shown in FIG. 5, the head portion of the inner irregular segment 133A includes a crossover portion 134A that extends in radially inside area of a circle on which the centers of the head portions 331c of the large segments 331 are located. The crossover portion 134A is continuous and does not have any connection portion therein. The crossover portion 134A is straight when projected on a surface in parallel with the axis of the stator core and inclines to the circumferential direction of the stator core. It extends to be almost in contact with a portion of the large segment 331 that extends along the center axis of the stator core, as shown in FIG. 6. The head portion of the inner irregular segment 133A also includes a pair of inclined portions 13 5A each of which extends from the crossover portion 134A to an in-slot portion in parallel with an inclined portion of an adjoining regular U-shaped segment, as shown in FIG. 7. The inner irregular segments 133B and 133C are substantially the same as the irregular segment 133A.

The outer irregular segment 133D has one in-slot portion that is disposed in the fifth layer P5 of slot #22 (the number on the inner side) of the slots 35 and the other in-slot portion that is disposed in the fourth layer P4 of slot #33 of the slots 35. As shown in FIG. 5, the head portion of the outer irregular segment 133D includes a crossover portion 134D that extends in an area between the centers of the head portions 331c of the large segments 331 of the first subset S1 and the centers of the head portions 332c of the small segments 332 of the second subset S2. The crossover portion 134D is continuous and does not have any connection portion therein. The crossover portion 134D is straight when projected on a surface in parallel with the axis of the stator core and extends along the circumferential direction of the stator core. It extends almost in contact with portions of both the large segment 331 of the first subset S1 and the small segment 332 of the second subset S2, that extends along the center axis of the stator cores, as shown in FIG. 6. The head portion of the inner irregular segment 133A also includes a pair of inclined portions 135A each of which extends from the crossover portion 134A to an in-slot portion in parallel with an inclined portion of an adjoining regular U-shaped segment, as shown in FIG. 7. The inner irregular segments 133B and 133C are substantially the same as the irregular segment 133A.

As shown in FIG. 6, the first subset S1 has a greater height H1 from an axial end of the stator core 1 than a height H2 of the second subset S2. In other words, the head portions of the regular segments become higher as they approach the center axis of the stator core 1. Further, the head portions of large segment 331 of the first subset S1 and the small segment 332 of the second subset S2 are disposed in contact with each other.

As shown in FIG. 5, the crossover portion 134A of the 133A crosses over two neighboring regular segments 331', 331" of the first subset S1, and the crossover portion 134D of the 133D crosses over two neighboring regular segments 332', 332" of the second subset S2. Both two neighboring regular segments 331', 331" and two neighboring regular segments 332', 332" are arranged to be closer to each other in the circumferential direction than other regular segments that the irregular segments do not cross over. This arrangement is effective to limit or minimize the height and the outside diameter of the coil end groups and, also, the length of the stator winding 3.

Figure 8:
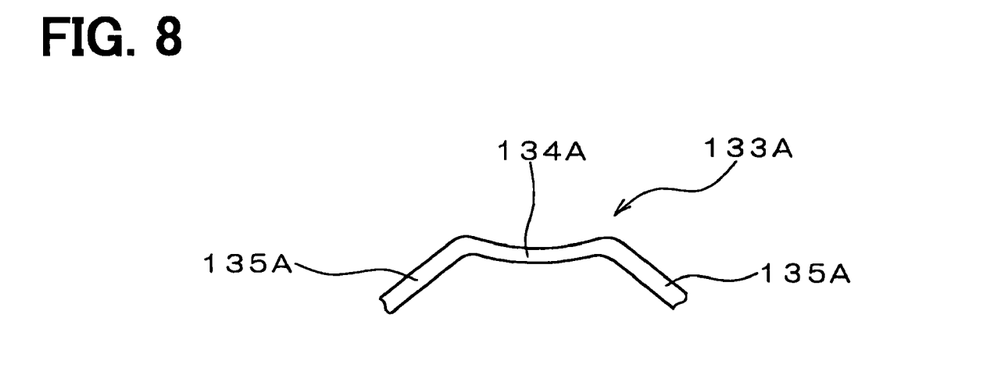
FIG. 8 illustrates a modified irregular U-shaped conductor segment.

The irregular segment may be shaped so that the central portion of the crossover portion can hang down as shown in FIG. 8. This is effective to reduce bending stress between the crossover portion 134A and the inclined portion 135A.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A stator of a rotary electric machine comprising a stator winding and a stator core having a plurality of slots in which portions of the stator winding are disposed,
   wherein said stator winding comprises:
   a plurality of series-connected regular segments having a pair of in-slot portions inserted into a regularly disposed pair of the slots and a turn portion; and
   a plurality of irregular segments having a pair of in-slot portions disposed in a pair of slots whose location is suitable to connect the regular segments to form said stator winding and a continuous crossover portion crossing over some of said regular segments, segments, wherein;
   the turn portions of said regular segments have portions extending along a center axis of said stator core between the top thereof and one end of the stator core; and
   said continuous crossover portion is substantially straight and extends to be in contact with the portions of said regular segments extending along the center axis so as to minimize a height and an outside diameter of said stator winding.

2. The stator as claimed in claim 1,
   wherein some of said crossover portions extend in the circumferential direction of said stator core.

3. The stator as claimed in claim 2,
   wherein some of said crossover portions extend in a direction inclined to the circumferential direction of said stator core.

4. The stator as claimed in claim 1, wherein:
   said plurality of regular segments comprises a plurality of sets each of which includes a first subset of conductor segments disposed at inner circumference of the stator core and a second subset of a conductor segment;
   said first subset includes a large regular U-shaped conductor segment and small regular U-shaped conductor segment, each of which has the turn portion; and
   said second subset includes a regular U-shaped conductor segment that has the same shape as, and a smaller height from an axial end of said stator core than, the first subset.

5. The stator as claimed in claim 4,
   wherein said first subset is disposed in said stator core radially inside the second subset so that the turn portions of said regular segments disposed radially inside of said stator core can be higher than those disposed radially outside of said stator core.

6. The stator as claimed in claim 5,
   wherein the crossover portion of said irregular segments is disposed between said first subsets and said second subsets.

7. The stator as claimed in claim 4,
wherein said first subset and the second subset are disposed to be in contact with each other at their turn portions.

8. The stator as claimed in claim 1,
wherein said irregular segment includes a pair of inclined portions each of which extends from the crossover portion in parallel with an inclined portion of an adjoining regular U-shaped segment.

9. The stator as claimed in claim 1,
wherein said crossover portion crosses over two neighboring regular segments that are arranged to be closer to each other in the circumferential direction than other regular segments.

10. A stator of a rotary electric machine including a stator winding and a stator core having a plurality of slots, said stator winding comprising a plurality of sets of regular conductor segments, each of which has a pair of in-slot portions inserted into a regularly disposed pair of the slots and a turn portion, and a plurality of irregular segments having a pair of in-slot portions disposed in a pair of the slots whose location is suitable to connect the regular segments to form said stator winding and a continuous crossover portion crossing over some of said regular segments, wherein:

each of said sets includes a first subset of the regular conductor segments disposed at an inner circumference of the stator core and a second subset of the regular conductor segment disposed at an outer circumference of the stator core, said first subset including a larger one of the regular conductor segments and a smaller one of the regular conductor segments that has a smaller height from an axial end of said stator core than the larger one, said second subset including the smaller one of the regular conductor segments; and said continuous crossover portion of said irregular segments is substantially straight and extends to be in contact with the portions of said regular segments between the top of the turn portions of said regular conductor segments and the axial end of said stator core.

11. A stator of a rotary electric machine comprising:
a stator core having a plurality of slots; and
a stator winding including a plurality of regular segments having a pair of in-slot portions inserted into a regularly disposed pair of the slots and a turn portion and a plurality of irregular segments having a pair of in-slot portions disposed in a pair of the slots whose location is suitable to connect the regular segments and a continuous crossover portion crossing over some of said regular segments; wherein:

said plurality of regular segments comprises a plurality of sets each of which includes a first subset of conductor segments disposed at a first circumference of the stator core and a second subset of a conductor segment disposed at a second circumference of the stator core that is outside of said first circumference;

the crossover portion of said irregular segments is disposed between said first subsets and said second subsets.

12. The stator as claimed in claim 11, wherein said first subset has a greater height from an axial end of the stator core than said second subset, and said continuous crossover portion of said irregular segments is substantially straight and extends to be in contact with the turn portion of said regular segments so as to minimize the height and the outside diameter of the stator winding.

* * * * *